US011809865B2

(12) United States Patent
Halter et al.

(10) Patent No.: US 11,809,865 B2
(45) Date of Patent: Nov. 7, 2023

(54) METHOD AND SYSTEM FOR EVIDENCE SERVICING

(71) Applicant: JPMorgan Chase Bank, N.A., New York, NY (US)

(72) Inventors: Bryan P Halter, Merrimack, NH (US); Sandhya Sridharan, Los Altos, CA (US); Sujeily Rodriguez, Wesley Chapel, FL (US); Edward Kerbler, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 261 days.

(21) Appl. No.: 17/242,837

(22) Filed: Apr. 28, 2021

(65) Prior Publication Data
US 2022/0350597 A1 Nov. 3, 2022

(51) Int. Cl.
*G06F 8/77* (2018.01)
*G06Q 30/018* (2023.01)
*G06F 16/25* (2019.01)
*G06F 3/14* (2006.01)
*G06Q 10/0639* (2023.01)
*G06N 20/00* (2019.01)

(52) U.S. Cl.
CPC ............. *G06F 8/77* (2013.01); *G06F 3/14* (2013.01); *G06F 16/258* (2019.01); *G06Q 10/06395* (2013.01); *G06Q 30/018* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,503,479 B2 * | 12/2019 | Brealey | G06F 8/71 |
| 10,891,129 B1 * | 1/2021 | Antonio | G06F 40/20 |
| 2017/0147334 A1 * | 5/2017 | Antons | G06F 11/3476 |
| 2018/0115464 A1 * | 4/2018 | Fighel | H04L 41/20 |
| 2019/0147354 A1 * | 5/2019 | Gao | G06Q 10/06393 706/11 |
| 2019/0347095 A1 * | 11/2019 | Adams | G06F 8/77 |
| 2020/0081814 A1 * | 3/2020 | Srinivasan | G06F 8/71 |
| 2022/0308866 A1 * | 9/2022 | Chivukula | G06F 8/35 |
| 2023/0025504 A1 * | 1/2023 | Avery | G06F 8/77 |

* cited by examiner

*Primary Examiner* — Ryan D. Coyer
(74) *Attorney, Agent, or Firm* — Greenblum & Bernstein, P.L.C.

(57) ABSTRACT

A method for providing an evidence service to facilitate evidence analytic and controls assessment for an enterprise toolchain is disclosed. The method includes compiling raw data via an adapter, the raw data including an event that relates to a software development life cycle; retrieving, from the adapter, the compiled raw data; identifying, by using a model, information that relates to the event from the raw data; extracting the identified information; generating, by using the model, a structured data set based on the extracted information; and determining a controls measurement based on the structured data set.

20 Claims, 5 Drawing Sheets

METHOD AND SYSTEM FOR EVIDENCE SERVICING

BACKGROUND

1. Field of the Disclosure

This technology generally relates to methods and systems for evidence servicing, and more particularly to methods and systems for providing generic evidence via an integrated evidence service to facilitate evidence analytic and controls measurement for an enterprise toolchain.

2. Background Information

Many business entities operate extensive enterprise networks of numerous software products such as, for example, a plurality of applications to provide services to customers as well as employees. The business entities may rely on software development schemas such as, for example, a continuous integration and continuous deployment (CI/CD) schema together with enterprise tool chains to manage the lifecycle of the software products. Often, an evidence service is also implemented to document each event in the lifecycle of the software products. Historically, implementation of conventional evidence services has resulted in varying degrees of success with respect to available feature sets and framework interoperability.

One drawback of using a conventional evidence service is that in many instances, event reports are generated by several different programming tools as the software product moves from one phase in the development lifecycle to another. As a result, the conventional evidence service may not be able to satisfy data requirements and provide consistent formatting for the event reports. Additionally, due to reliance on the different programming tools, the event reports that are provided by the conventional evidence service is tool dependent and requires additional data transformations for tooling changes.

Therefore, there is a need for an integrated evidence service that provides tool agnostic, generic evidence to facilitate evidence analytic and controls measurement for an enterprise toolchain.

SUMMARY

The present disclosure, through one or more of its various aspects, embodiments, and/or specific features or sub-components, provides, inter alia, various systems, servers, devices, methods, media, programs, and platforms for providing generic evidence via an integrated evidence service to facilitate evidence analytic and controls measurement for an enterprise toolchain.

According to an aspect of the present disclosure, a method for providing an evidence service to facilitate evidence analytic and controls assessment for an enterprise toolchain is disclosed. The method is implemented by at least one processor. The method may include compiling raw data via at least one adapter, the raw data may include at least one event that relates to a software development life cycle; retrieving, from the at least one adapter, the compiled raw data; identifying, by using at least one model, information that relates to the at least one event from the raw data; extracting the identified information; generating, by using the at least one model, at least one structured data set based on the extracted information; and determining at least one controls measurement based on the at least one structured data set.

In accordance with an exemplary embodiment, the at least one event may include at least one from among an action and an occurrence that relates to the software development life cycle.

In accordance with an exemplary embodiment, the at least one adapter may include at least one from among a code merged adapter, a code build adapter, a code scan adapter, an acceptance testing adapter, and a deployment adapter.

In accordance with an exemplary embodiment, the at least one adapter may support a plurality of client schemas for integration into an enterprise tool chain to compile a plurality of event types, the plurality of client schemas may include at least one third-party schema that is consumable by a tool that satisfies a minimum change requirement.

In accordance with an exemplary embodiment, the at least one controls measurement may include at least one timed controls measurement that is determined via at least one compliance and measurement tool that evaluates, measures, and evidences the at least one controls measurement at a point in time.

In accordance with an exemplary embodiment, the at least one timed controls measurement may be published to a cloud computing platform as part of staging a change for release, the change may relate to the software development lifecycle.

In accordance with an exemplary embodiment, the at least one controls measurement may be determined continuously to satisfy at least one from among a change requirement, a release requirement, and a controls requirement.

In accordance with an exemplary embodiment, for the generating, the method may further include identifying at least one requirement that corresponds to a change management process, the at least one requirement may include at least one predetermined event format; structuring the extracted information based on the at least one predetermined event format; and compiling the structured information into the at least one structured data set based on the at least one requirement.

In accordance with an exemplary embodiment, the method may further include determining a status based on the at least one structured data set, the status may correspond to a development phase in the software development life cycle; determining at least one metric for a software product based on the at least one structured data set and the at least one controls measurement, the at least one metric may include at least one from among a business metric and a performance metric; and displaying, via a graphical user interface, the determined status and the determined at least one metric.

In accordance with an exemplary embodiment, the at least one metric may include at least one predicted metric that is determined based on at least one structured data set and the at least one controls measurement by using the at least one model, the at least one predicted metric may correspond to a projection of the at least one metric.

According to an aspect of the present disclosure, a computing device configured to implement an execution of a method for providing an evidence service to facilitate evidence analytic and controls assessment for an enterprise toolchain is disclosed. The computing device comprising a processor; a memory; and a communication interface coupled to each of the processor and the memory, wherein the processor may be configured to compile raw data via at least one adapter, the raw data may include at least one event that relates to a software development life cycle; retrieve, from the at least one adapter, the compiled raw data; identify, by using at least one model, information that relates to the at least one event from the raw data; extract the identified information; generate, by using the at least one model, at least one structured data set based on the extracted information; and determine at least one controls measurement based on the at least one structured data set.

In accordance with an exemplary embodiment, the at least one event may include at least one from among an action and an occurrence that relates to the software development life cycle.

In accordance with an exemplary embodiment, the at least one adapter may include at least one from among a code merged adapter, a code build adapter, a code scan adapter, an acceptance testing adapter, and a deployment adapter.

In accordance with an exemplary embodiment, the processor may be further configured to cause the at least one adapter to support a plurality of client schemas for integration into an enterprise toolchain to compile a plurality of event types, the plurality of client schemas may include at least one third-party schema that is consumable by a tool that satisfies a minimum change requirement.

In accordance with an exemplary embodiment, the at least one controls measurement may include at least one timed controls measurement that is determined via at least one compliance and measurement tool that evaluates, measures, and evidences the at least one controls measurement at a point in time.

In accordance with an exemplary embodiment, the processor may be further configured to publish the at least one timed controls measurement to a cloud computing platform as part of staging a change for release, the change may relate to the software development lifecycle.

In accordance with an exemplary embodiment, the processor may be further configured to continuously determine the at least one controls measurement to satisfy at least one from among a change requirement, a release requirement, and a controls requirement.

In accordance with an exemplary embodiment, for the generating, the processor may be further configured to identify at least one requirement that corresponds to a change management process, the at least one requirement may include at least one predetermined event format; structure the extracted information based on the at least one predetermined event format; and compile the structured information into the at least one structured data set based on the at least one requirement.

In accordance with an exemplary embodiment, the processor may be further configured to determine a status based on the at least one structured data set, the status nay correspond to a development phase in the software development life cycle; determine at least one metric for a software product based on the at least one structured data set and the at least one controls measurement, the at least one metric may include at least one from among a business metric and a performance metric; and display, via a graphical user interface, the determined status and the determined at least one metric.

In accordance with an exemplary embodiment, the at least one metric may include at least one predicted metric that is determined based on the at least one structured data set and the at least one controls measurement by using the at least one model, the at least one predicted metric may correspond to a projection of the at least one metric.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
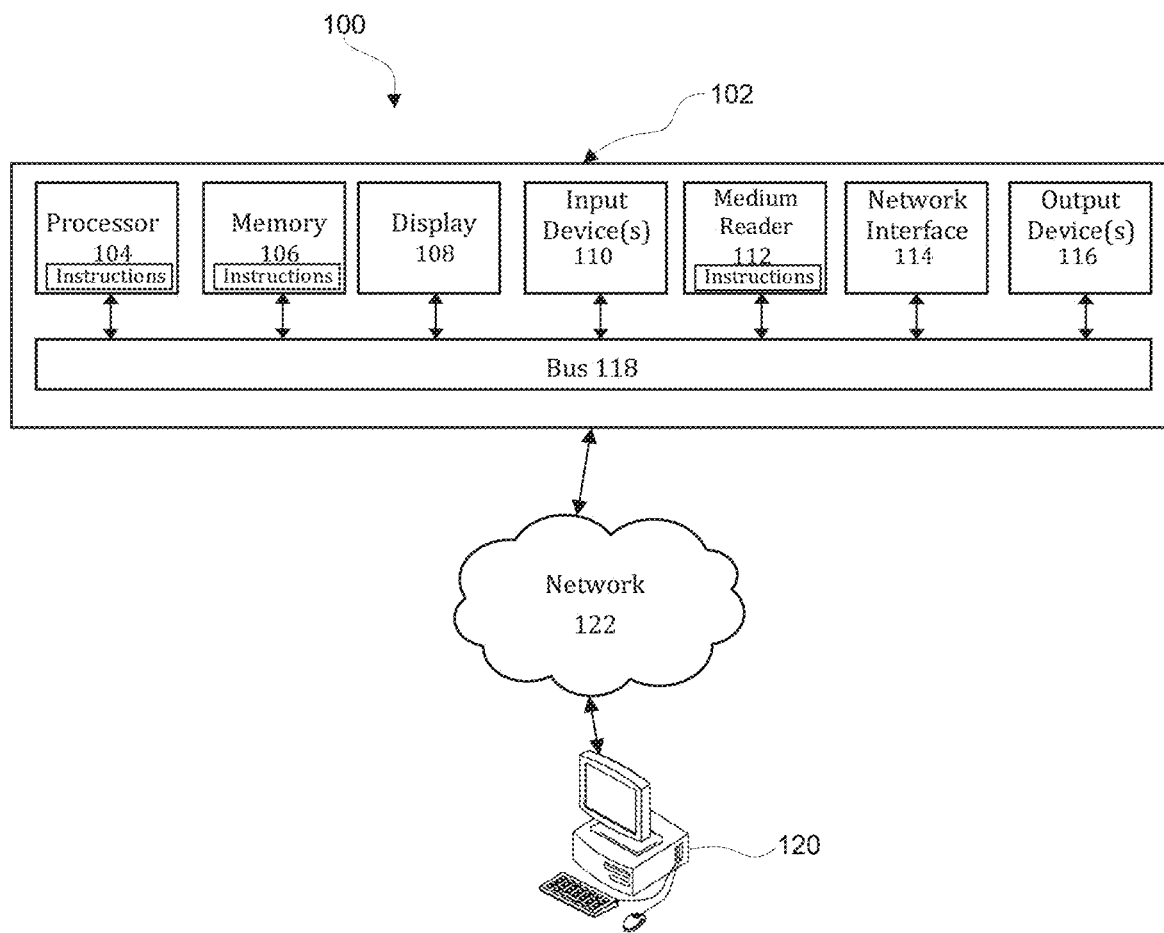
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing generic evidence via an integrated evidence service to facilitate evidence analytic and controls measurement for an enterprise toolchain.

Figure 2:
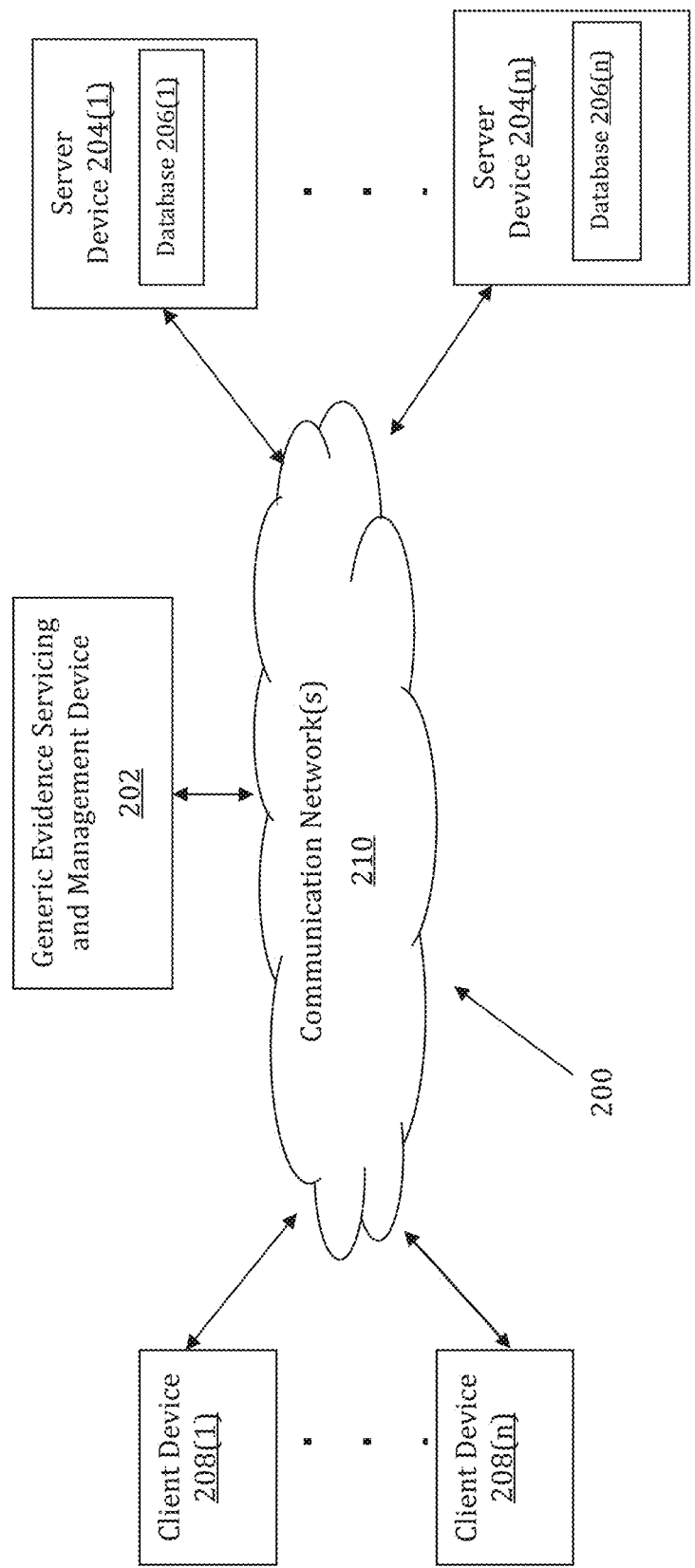
FIG. 2 illustrates an exemplary diagram of a network environment.

Referring to FIG. 2, a schematic of an exemplary network environment 200 for implementing a method for providing generic evidence via an integrated evidence service to facilitate evidence analytic and controls measurement for an enterprise toolchain is illustrated. In an exemplary embodiment, the method is executable on any networked computer platform, such as, for example, a personal computer (PC).

The method for providing generic evidence via an integrated evidence service to facilitate evidence analytic and controls measurement for an enterprise toolchain may be implemented by a Generic Evidence Servicing and Management (GESM) device 202. The GESM device 202 may be the same or similar to the computer system 102 as described with respect to FIG. 1. The GESM device 202 may store one or more applications that can include executable instructions that, when executed by the GESM device 202, cause the GESM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GESM device 202 itself, may be located in virtual server(s) running in a cloud-based computing environment rather than being tied to one or more specific physical network computing devices. Also, the application(s) may be running in one or more virtual machines (VMs) executing on the GESM device 202. Additionally, in one or more embodiments of this technology, virtual machine(s) running on the GESM device 202 may be managed or supervised by a hypervisor.

In the network environment 200 of FIG. 2, the GESM device 202 is coupled to a plurality of server devices 204(1)-204(n) that hosts a plurality of databases 206(1)-206(n), and also to a plurality of client devices 208(1)-208(n) via communication network(s) 210. A communication interface of the GESM device 202, such as the network interface 114 of the computer system 102 of FIG. 1, operatively couples and communicates between the GESM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GESM device 202, the server devices 204(1)-204(n), and/or the client devices 208(1)-208(n) may he coupled together via other topologies. Additionally, the network environment 200 may include other network devices such as one or more routers and/or switches, for example, which are well known in the art and thus will not be described herein. This technology provides a number of advantages including methods, non-transitory computer readable media, and GESM devices that efficiently implement a method for providing generic evidence via an integrated evidence service to facilitate evidence analytic and controls measurement for an enterprise toolchain.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modern, and the like), Public Switched Telephone Network (PSTNs), Ethernet-based Packet Data Networks (PDNs), combinations thereof, and the like.

The GESM device 202 may be a standalone device or integrated with one or more other devices or apparatuses, such as one or more of the server devices 204(1)-204(n), for example. In one particular example, the GESM device 202 may include or be hosted by one of the server devices 204(1)-204(n), and other arrangements are also possible. Moreover, one or more of the devices of the GESM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GESM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to event messages, evidence data, documentation information, raw data, structured data, controls measurements, status data, and metrics data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the GESM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the GESM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the GESM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GESM device 202, the server devices 204(1)-204(n), or the client devices 208(1)-208(n), for example, may be configured to operate as virtual instances on the same physical machine. In other words, one or more of the GESM device 202, the server devices 204(1)-204(n), or the client devices 208(1)-208(n) may operate on the same physical device rather than as separate devices communicating through communication network(s) 210. Additionally, there may be more or fewer GESM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
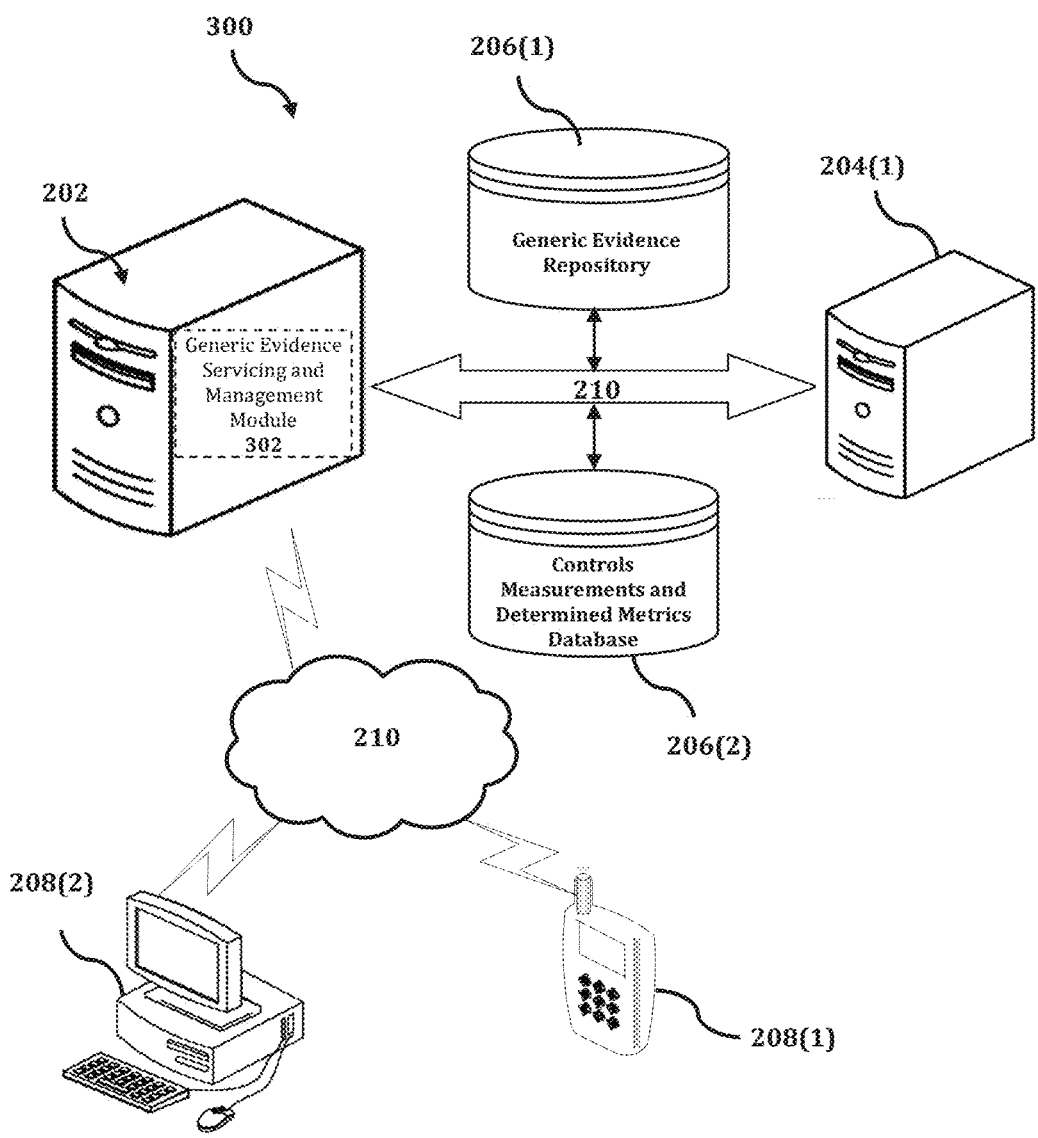
FIG. 3 shows an exemplary system for implementing a method for providing generic evidence via an integrated evidence service to facilitate evidence analytic and controls measurement for an enterprise toolchain.

The GESM device 202 is described and shown in FIG. 3 as including a generic evidence servicing and management module 302, although it may include other rules, policies, modules, databases, or applications, for example. As will be described below, the generic evidence servicing and management module 302 is configured to implement a method for providing generic evidence via an integrated evidence service to facilitate evidence analytic and controls measurement for an enterprise toolchain.

An exemplary process 300 for implementing a mechanism for providing generic evidence via an integrated evidence service to facilitate evidence analytic and controls measurement for an enterprise toolchain by utilizing the network environment of FIG. 2 is shown as being executed in FIG. 3. Specifically, a first client device 208(1) and a second client device 208(2) are illustrated as being in communication with GESM device 202. In this regard, the first client device 208(1) and the second client device 208(2) may be "clients" of the GESM device 202 and are described herein as such. Nevertheless, it is to be known and understood that the first client device 208(1) and/or the second client device 208(2) need not necessarily be "clients" of the GESM device 202, or any entity described in association therewith herein. Any additional or alternative relationship may exist between either or both of the first client device 208(1) and the second client device 208(2) and the GESM device 202, or no relationship may exist.

Further, GESM device 202 is illustrated as being able to access a generic evidence repository 206(1) and a controls measurement and determined metrics database 206(2). The generic evidence servicing and management module 302 may be configured to access these databases for implementing a method for providing generic evidence via an integrated evidence service to facilitate evidence analytic and controls measurement for an enterprise toolchain.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the GESM device 202 via broadband or cellular communication. Of course, these embodiments are merely exemplary and are not limiting or exhaustive.

Upon being started, the generic evidence servicing and management module 302 executes a process for providing generic evidence via an integrated evidence service to facilitate evidence analytic and controls measurement for an enterprise toolchain. An exemplary process for providing generic evidence via an integrated evidence service to facilitate evidence analytic and controls measurement for an enterprise toolchain is generally indicated at flowchart 400 in FIG. 4.

Figure 4:
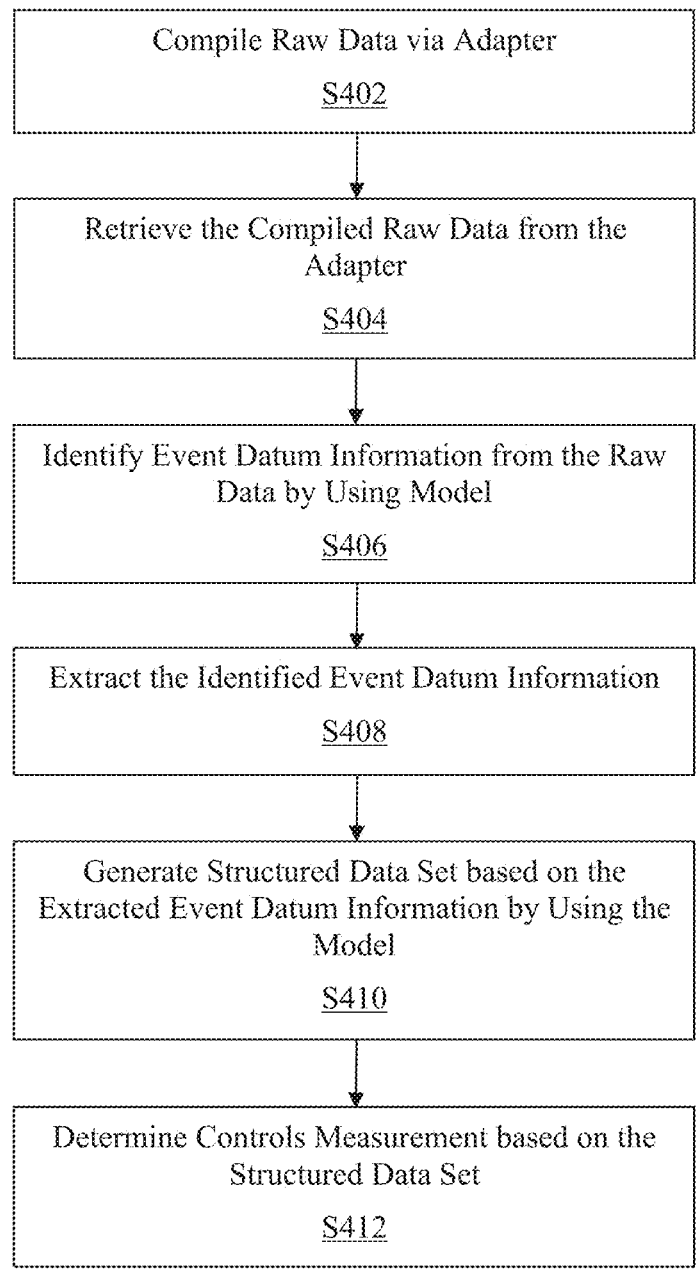
FIG. 4 is a flowchart of an exemplary process for implementing a method for providing generic evidence via an integrated evidence service to facilitate evidence analytic and controls measurement for an enterprise toolchain.

In the process 400 of FIG. 4, at step S402, raw data may be compiled via an adapter. In an exemplary embodiment, the raw data may correspond to primary data that is collected and formatted by the adapter. The primary data may include unprocessed data as well as pre-processed data. In another exemplary embodiment, the raw data may include an event that relates to a software development lifecycle. The event may include at least one from among an action and an occurrence that relates to the software development lifecycle. For example, the action event may relate to a deployment action for a software product and the occurrence event may relate to a detected fault event for the software product. As will be appreciated by a person of ordinary skill in the art, information relating to the event may be utilized to evidence the action and the occurrence in the development lifecycle for the software product.

In another exemplary embodiment, the software product may correspond to a computing program such as, for example, an application that performs a specified function via a computing device. The application may include at least one from among a monolithic application and a microservice application. In another exemplary embodiment, the monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real-time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the adapter may include at least one from among a code merged adapter, a code build adapter, a code scan adapter, an acceptance testing adapter, and a deployment adapter. The adapter may support a plurality of client schemas for integration into an enterprise toolchain to compile a plurality of event types from a plurality of tools in the enterprise toolchain. For example, by utilizing adapters, extended raw data may be compiled from a plurality of different tools to facilitate analytics for change management, controls measurements, and software development life cycle metrics from software conception to software delivery. In another exemplary embodiment, the plurality of client schemas may include a third-party schema that is consumable by a tool that satisfies a predetermined minimum change requirement. Then, at step S404, the compiled raw data may be retrieved from the adapter.

At step S406, information that relates to the event may be identified from the raw data by using a model. The information may include event data that is specific to a particular software product. In an exemplary embodiment, the information corresponding to a certain event may be found in a plurality of formats in the compiled raw data, For example, event data that is specific to application A may be found in raw data that has been collected by two different adapters.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that the training model's least squares error rate, true positive rate, true negative rate, false positive rate, and false negative rates are within predetermined ranges. In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S408, the identified information may be extracted, and at step S410, a structured data set based on the extracted information may be generated by using the model. In an exemplary embodiment, the structured data set may correspond to a generic event data format such as, for example, a generic evidence format that is consistent with predetermined data requirements and predetermined formatting requirements of a change management process. The generic evidence format may ensure that data reported to users such as, for example, software developers as well as system administrators are consistently measured and reported regardless of a source tool in the enterprise toolchain. In another exemplary embodiment, integration with an application programming interface (API) such as, for example, a representational state transfer (REST) contract API that provides access to resources via a uniform resource identifier (URI) may ensure reliable data exchanges.

In another exemplary embodiment, for the generating procedure, a requirement that corresponds to a change management process may be identified. The requirement may include a predetermined event format. Then, the extracted information may be structured based on the predetermined event format. The structured information may be compiled into the structured data set based on the requirement. In another exemplary embodiment, the structured data set based on the requirement may remain consistent regardless of the required toolchain. For example, when a different toolchain is required, the structured data set may remain consistent and only the tooling to perform the work and supply the event data needs to be changed. As will be appreciated by a person of ordinary skill in the art, by providing event data in the structured data set (i.e., evidence in a generic format), analytics based on the structured data set are tool agnostic.

At step S412, a controls measurement based on the structured data set may be determined. In an exemplary embodiment, the controls measurement may be determined continuously to satisfy at least one from among a change requirement, a release requirement, and a controls requirement. The continuously determined controls measurement may be utilized to satisfy the above requirements from a single point in space for all software products to ensure a consistent compliance view. In another exemplary embodiment, the continuous control measurements of the software product during the software development lifecycle may enable automatic detection of noncompliance of predetermined rules by the software product. The controls measurement of the software product may be verified for compliance parameters such as, for example, security parameters, failure parameters, and deployment parameters.

In another exemplary embodiment, the controls measurement may be determined in real-time based on an input from a user. The user input may be received via a graphical element in a graphical user interface. For example, a developer may utilize the graphical user interface to initiate a process to obtain a controls measurement for a particular software product o determine whether the particular software product is ready for deployment. In another exemplary embodiment, the user may reliably prove that the particular software product satisfies predetermined requirements based on corresponding controls measurements and based on further analytics of corresponding structured data sets.

In another exemplary embodiment, the controls measurement may include a timed controls measurement that is determined via a compliance and measurement tool that evaluates, measures, and evidences the controls measurement at a point in time. The timed controls measurement may be published to a workflow cloud platform such as, for example, a SERVICENOW platform as part of staging a change for release and may be extended when submitting a change ticket. As will be appreciated by a person of ordinary skill in the art, the change may relate to the software development lifecycle.

In another exemplary embodiment, a status may be determined for the software product based on the structured data set. The status may correspond to a development phase in the software development life cycle. Then, a metric for a particular software product may be determined based on the structured data set and the controls measurement. In another exemplary embodiment, the metric may include at least one from among a business metric such as, for example, a time-to-market metric and a performance metric such as, for example, a resource utilization metric. The determined status and the determined metric may be displayed as a graphical element via a graphical user interface. In another exemplary embodiment, the metric for a plurality of different software products may be combined to facilitate pattern analysis such as, for example, a usage pattern analysis.

In another exemplary embodiment, the metric may also include a predicted metric that is determined based on the structured data set and the controls measurement by using the model. The predicted metric may correspond to a projection of the metric. For example, by feeding the structured data set into the model, a predicted metric may be determined for a particular software product that is awaiting deployment. The predicted metric may highlight the quality of the software product from a compliance standpoint to facilitate deployment authorization for the software product.

Figure 5:
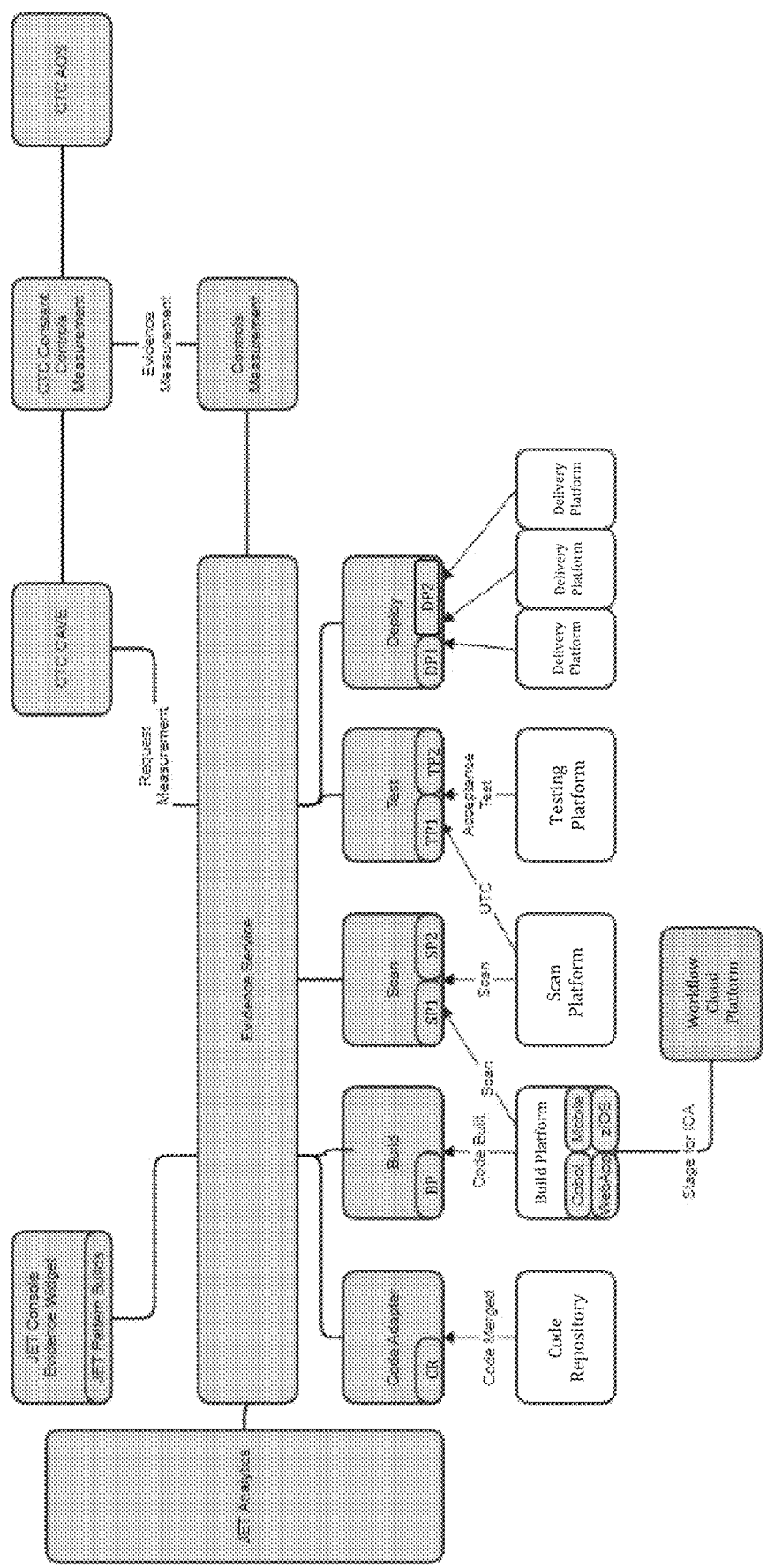
FIG. 5 is a diagram that illustrates an architecture that is usable for implementing a method for providing generic evidence via an integrated evidence service to facilitate evidence analytic and controls measurement for an enterprise toolchain, according to an exemplary embodiment.

FIG. 5 is a diagram 500 that illustrates an architecture that is usable for implementing a method for providing generic evidence via an integrated evidence service to facilitate evidence analytic and controls measurement for an enterprise toolchain, according to an exemplary embodiment. In an exemplary embodiment, the invention disclosed in the present application may be represented as the component titled "Evidence Service."

As illustrated in FIG. 5, the evidence service may utilize a plurality of adapters such as, for example, a code adapter, a code build adapter, a code scan adapter, a code test adapter, and a deployment adapter to retrieve raw data from a plurality of tools in a toolchain. The evidence service may utilize the plurality of adapters to collect the raw data and generate a structured data set that includes generic evidence consistent with disclosures in the present application.

In another exemplary embodiment, the plurality of tools may include a code repository tool, a build platform tool, a scan platform tool, a testing platform tool, and a delivery platform tool. The plurality of tools may perform functions related to a software development lifecycle function. The plurality of tools may be further integrated with third-party platforms such as, for example, a third-party workflow cloud platform. The plurality of tools may perform functions consistent with disclosures in the present application.

In another exemplary embodiment, the evidence service may be integrated with analytics components such as, for example, an analytics component titled "JET Analytics" and an analytics component titled "JET Console Evidence Widget." The integrated analytics components may request the structured data set from the evidence service to perform further analytic actions. Additionally, the evidence service may also be integrated with a stack of compliance and measurement tools that retrieve measurement data from the evidence service to evaluate, measure, and evidence controls measurements at a point in time. The stack of compliance and measurement tools may include tools such as, for example, a tool titled "CTC CAVE," a tool titled "CTC Constant Controls Measurement," and a tool titled "CTC AOS." In another exemplary embodiment, the CTC constant controls measurement tool may request evidence measurements directly from a controls measurement component of the evidence service.

Accordingly, with this technology, an optimized process for providing generic evidence via an integrated evidence service to facilitate evidence analytic and controls measurement for an enterprise toolchain is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an evidence service to facilitate evidence analytic and controls assessment for an enterprise toolchain, the method being implemented by at least one processor, the method comprising:
    compiling, by the at least one processor, raw data via at least one adapter, the raw data including at least one event that relates to a software development life cycle;
    retrieving, by the at least one processor from the at least one adapter, the compiled raw data;
    identifying, by the at least one processor using at least one model, information that relates to the at least one event from the raw data;
    extracting, by the at least one processor, the identified information;
    generating, by the at least one processor using the at least one model, at least one structured data set based on the extracted information;
    determining, by the at least one processor, at least one controls measurement based on the at least one structured data set; and
    automatically detecting, by the at least one processor using the at least one controls measurement, at least one nonconforming software product that is noncompliant with at least one predetermined rule by,
        verifying, by the at least one processor, each of the at least one controls measurement based on at least one compliance parameter,
        wherein the at least one compliance parameter includes at least one from among a security parameter, a failure parameter, and a deployment parameter.

2. The method of claim 1, wherein the at least one event includes at least one from among an action and an occurrence that relates to the software development life cycle.

3. The method of claim 1, wherein the at least one adapter includes at least one from among a code merged adapter, a code build adapter, a code scan adapter, an acceptance testing adapter, and a deployment adapter.

4. The method of claim 3, wherein the at least one adapter supports a plurality of client schemas for integration into an enterprise toolchain to compile a plurality of event types, the plurality of client schemas including at least one third-party schema that is consumable by a tool that satisfies a minimum change requirement.

5. The method of claim 1, wherein the at least one controls measurement includes at least one timed controls measurement that is determined via at least one compliance and measurement tool that evaluates, measures, and evidences the at least one controls measurement at a point in time.

6. The method of claim 5, wherein the at least one timed controls measurement is published to a cloud computing platform as part of staging a change for release, the change relating to the software development lifecycle.

7. The method of claim 1, wherein the at least one controls measurement is determined continuously to satisfy at least one from among a change requirement, a release requirement, and a controls requirement.

8. The method of claim 1, wherein the generating further comprises:
    identifying, by the at least one processor, at least one requirement that corresponds to a change management process, the at least one requirement including at least one predetermined event format;
    structuring, by the at least one processor, the extracted information based on the at least one predetermined event format; and
    compiling, by the at least one processor, the structured information into the at least one structured data set based on the at least one requirement.

9. The method of claim 1, further comprising:
    determining, by the at least one processor, a status based on the at least one structured data set, the status corresponding to a development phase in the software development life cycle;
    determining, by the at least one processor, at least one metric for a software product based on the at least one structured data set and the at least one controls measurement, the at least one metric including at least one from among a business metric and a performance metric; and
    displaying, by the at least one processor via a graphical user interface, the determined status and the determined at least one metric.

10. The method of claim 9, wherein the at least one metric includes at least one predicted metric that is determined based on the at least one structured data set and the at least one controls measurement by using the at least one model, the at least one predicted metric corresponding to a projection of the at least one metric.

11. A computing device configured to implement an execution of a method for providing an evidence service to facilitate evidence analytic and controls assessment for an enterprise toolchain, the computing device comprising:
    a processor;
    a memory; and
    a communication interface coupled to each of the processor and the memory,
    wherein the processor is configured to:
        compile raw data via at least one adapter, the raw data including at least one event that relates to a software development life cycle;
        retrieve, from the at least one adapter, the compiled raw data;
        identify, by using at least one model, information that relates to the at least one event from the raw data;
        extract the identified information;
        generate, by using the at least one model, at least one structured data set based on the extracted information;
        determine at least one controls measurement based on the at least one structured data set; and
        automatically detect, by using the at least one controls measurement, at least one nonconforming software product that is noncompliant with at least one predetermined rule by causing the processor to:

verify each of the at least one controls measurement based on at least one compliance parameter,
wherein the at least one compliance parameter includes at least one from among a security parameter, a failure parameter, and a deployment parameter.

12. The computing device of claim 11, wherein the at least one event includes at least one from among an action and an occurrence that relates to the software development life cycle.

13. The computing device of claim 11, wherein the at least one adapter includes at least one from among a code merged adapter, a code build adapter, a code scan adapter, an acceptance testing adapter, and a deployment adapter.

14. The computing device of claim 13, wherein the processor is further configured to cause the at least one adapter to support a plurality of client schemas for integration into an enterprise toolchain to compile a plurality of event types, the plurality of client schemas including at least one third-party schema that is consumable by a tool that satisfies a minimum change requirement.

15. The computing device of claim 11, wherein the at least one controls measurement includes at least one timed controls measurement that is determined via at least one compliance and measurement tool that evaluates, measures, and evidences the at least one controls measurement at a point in time.

16. The computing device of claim 15, wherein the processor is further configured to publish the at least one timed controls measurement to a cloud computing platform as part of staging a change for release, the change relating to the software development lifecycle.

17. The computing device of claim 11, wherein the processor is further configured to continuously determine the at least one controls measurement to satisfy at least one from among a change requirement, a release requirement, and a controls requirement.

18. The computing device of claim 11, wherein, for the generating, the processor is further configured to:
identify at least one requirement that corresponds to a change management process, the at least one requirement including at least one predetermined event format;
structure the extracted information based on the at least one predetermined event format; and
compile the structured information into the at least one structured data set based on the at least one requirement.

19. The computing device of claim 11, wherein the processor is further configured to:
determine a status based on the at least one structured data set, the status corresponding to a development phase in the software development life cycle;
determine at least one metric for a software product based on the at least one structured data set and the at least one controls measurement, the at least one metric including at least one from among a business metric and a performance metric; and
display, via a graphical user interface, the determined status and the determined at least one metric.

20. The computing device of claim 19, wherein the at least one metric includes at least one predicted metric that is determined based on the at least one structured data set and the at least one controls measurement by using the at least one model, the at least one predicted metric corresponding to a projection of the at least one metric.

* * * * *